INVENTOR
Robert W. Smith
BY Stanley E. Ross
ATTORNEY

United States Patent Office 2,794,059
Patented May 28, 1957

2,794,059
SEALED TIP THERMOCOUPLES

Robert W. Smith, Flint, Mich., assignor to General Motors Corporation, Detroit, Mich., a corporation of Delaware Application March 4, 1953, Serial No. 340,223

9 Claims. (Cl. 136—4)

This invention relates to improvements in the construction of electrical conductor assemblies and more particularly to improvements in electrical conductor assemblies which are exposed to high temperatures.

Difficulties have heretofore been encountered in providing adequate means for sealing electrical conductors within protective or insulating housings when exposed to extremely high temperatures, and particularly when rapidly heated to high temperatures. In modern gas turbine engines, for example, where it is important to measure the temperatures at various points in an engine, with operating temperatures which at times are as high as about 1800° F., measuring such temperatures requires the use of heat-resistant thermocouples. However, up to the present time, certain difficulties have been encountered in using thermocouples because, in a relatively short time, unburned fuel and other fluids present in the engine leak around the thermocouple lead wires forming the thermocouple junction into the protective housing. As a result, fluids such as unburned fuel permeate the high temperature insulation material and, by carbonization of the fuel, short-circuit the lead wires. It has been proposed in the past to prevent such damage by sealing off the ends of thermocouple wire conduits. However, up to the present time, such a seal has been highly impracticable in many applications because under operation temperatures and pressures the seals have either failed to adequately prevent entry of contaminating fluids around the conductors or, in many cases, the seal, together with a portion of the insulating material, has been expelled by the pressure of the gas generated within the insulation when heated to a high temperature thus permitting an uncontrolled leakage of fluids around the conductors and consequent electrical failure.

A somewhat analogous problem exists in the construction of other electrical elements such as electrical heating elements used in household electric stoves. Typical heating elements include an outer metallic tube carrying a resistance heating wire and filled with an insulating material. When such an element is heated, gases are expelled from within the insulation and later, as the element cools, moisture and other fluids can enter the metallic tube around the conductor to corrode or otherwise damage the conductor or insulating material.

Accordingly, one object of this invention is to provide means for effectively sealing electrical conductor assemblies to prevent entry of contaminating fluids. Another object is the provision of effective high temperature sealing means for thermocouple lead wires, resistance heating elements, and the like. Another object is to provide an insulated electrical conductor adapted to permit the gradual expulsion of air and other gases under pressure from within the insulation, but to preclude entry of contaminating fluids. A further object is to provide an improved thermocouple wire structure having sealing means adapted to prevent entry of fluids into the insulation at high temperatures. A still further object is to provide sealing means for electrical conductors capable of sustained operation at high temperatures after being rapidly heated thereto. These and other objects will more fully appear from the description which follows and the accompanying drawing in which:

The present invention contemplates sealing at least one electrical conductor, adapted to be subjected to high temperatures, within a protective housing in such a manner as to preclude entry into the housing of contaminating gases, vapors or other fluids. The sealing means of the present invention not only successfully prevents short circuiting and other damage by contaminating fluids but permits a gradual seepage of fluid outwardly from the housing. Additionally, the sealing means is well adapted to resist expulsion even under the gaseous pressures generated upon rapidly heating a sealed structure to a high temperature.

More particularly, the invention provides sealing means for thermocouple lead wires, electrical heating elements, and the like to prevent damage to the electrical insulation and/or the electrical conductors disposed within the housing member by corrosive or electro-conductive fluids. The sealing means of the present invention broadly comprises a ceramic type plug adapted to fit within the tubular or other shaped housing member and, since no matching of thermal coefficients of expansion of the component parts is obtained, to permit a gradual outward passage or seepage of fluids, while preventing contamination or electrical short circuiting by entry of fluids such as unburned fuel and the like around the electrical conductors. The ceramic plugs, themselves sealing off all but a small space around their periphery within the shell, are secured in place, and additional sealing means provided, by a bond of fused glass or the like. In a preferred embodiment the ceramic plug is recessed slightly within the housing and an exposed edge of the housing is bent inwardly to mechanically increase the resistance to expulsion of the sealing means at high temperatures.

Figure 1:
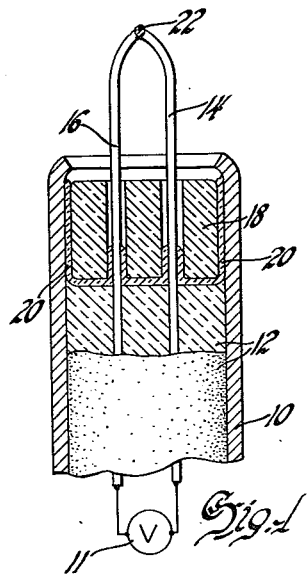
Fig. 1 is a schematic view, partially in section, of a thermocouple lead wire formed in accordance with the invention.

In the accompanying drawing, Fig. 1 illustrates a thermocouple lead wire assembly comprising a shell or housing member 10, typically of tubular stainless steel or the like; a heat-resistant insulating material 12, such as magnesia or other high temperature insulation; electrical lead wires 14 and 16; and a ceramic plug member 18 which is bonded to the interior of the housing, and to the lead wires, through a layer 20 of fused glass or similar material adapted to permit the gradual outward seepage of fluids within the housing member while precluding entry of contaminating fluids. The lead wires 14 and 16 are formed typically of such combinations of metals or alloys as iron and Constantan, Chromel and Alumel, or such noble metal combinations as platinum rhodium and platinum which provide, at thermocouple junction 22, the desired thermoelectric effects when employed with conventional thermocouple temperature measuring instruments as indicated schematically at 11.

Figure 2:
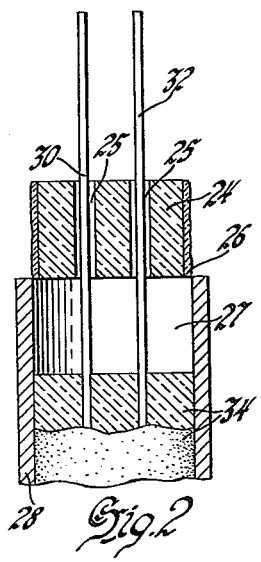
Fig. 2 is a schematic view, partially in section, of a partially assembled thermocouple lead wire structure in accordance with the invention.
Figure 3:
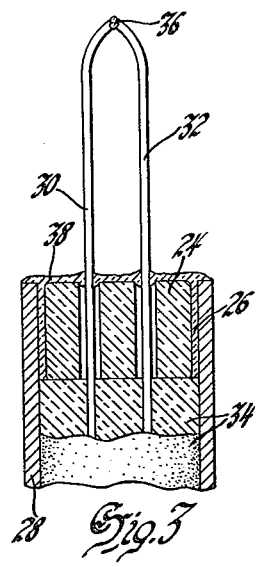
Fig. 3 is a view similar to Fig. 2 illustrating a completed lead wire structure embodying the invention.

Figs. 2 and 3 illustrate one method of assembly in accordance with the present invention in which a ceramic plug 24, having openings 25 through which pass lead wires 30 and 32, is pre-coated around its periphery with a layer 26 of sealing glass material, and thereafter hot pressed into a recess 27 in insulation material 34 filling a tubular housing 28. Lead wires 30 and 32 are subsequently joined, preferably by welding, to form an unshielded loop thermocouple junction 36.

In many instances it is desirable to provide an additional coating 38 of fused glass integrally bonded to the glass 26 sealing around the outer periphery of the ceramic plug 24. It will be observed that a relatively large area of the interior of the housing is utilized. Accordingly, the resultant structure is well able to resist not only entry of fluids but, at least equally important, expulsion of the sealing means when the structure is exposed to high temperatures and particularly when rapidly heated thereto.

Figure 4:
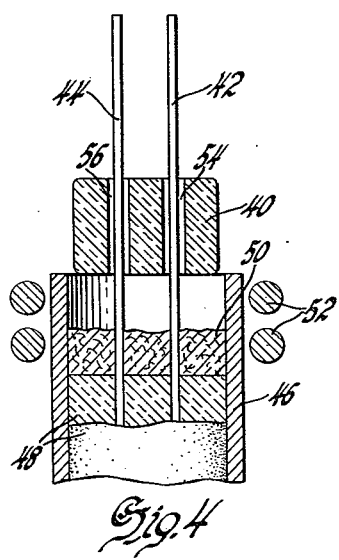
Fig. 4 is a schematic view, partially in section, illustrating a partially assembled thermocouple lead wire structure in accordance with another embodiment of the invention.
Figure 5:
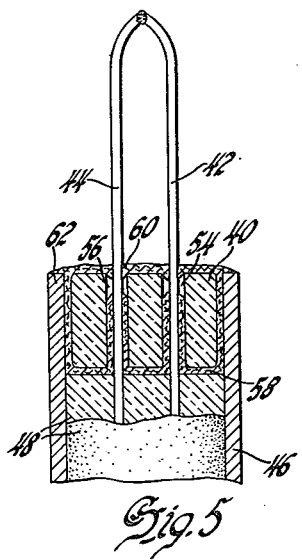
Fig. 5 is a view similar to Fig. 4 illustrating a completed lead wire structure in accordance with another embodiment of the invention.

Figs. 4 and 5 illustrate another embodiment of the invention wherein a ceramic plug 40 is pressed axially into a quantity of softened or fused glass sealing material 50 replacing insulation material 48 in the end of a tubular housing 46 containing lead wires 42 and 44. The glass sealing material preferably is heated in situ by an induction coil as indicated schematically at 52. As the ceramic plug 40 is pressed into place, the softened glass, providing a seal 58 at the base of the plug 40, flows up into the lead wire openings 54 and 56 as shown in Fig. 5 to improve the effectiveness of the sealing means. In certain applications, it is desirable to provide an additional coating 60 of glass sealing material flowed over the exposed end of the ceramic plug. If desired, in the structure shown in Fig. 5, the ceramic plug 40 may be recessed within the open end of the tube and the exposed edge 62 of the tube crimped or peened inwardly as shown in Fig. 1.

While a one-piece ceramic plug is preferred, in some applications, as where it is desired to form the thermocouple junction before sealing the wires within a housing, a two-piece plug split longitudinally may be used. Such a plug typically comprises two hemi-cylindrical members having longitudinal grooves which, when aligned, form openings for lead wires. Using such a modified sealing means, it is desirable in most instances to pre-coat the flat contacting surfaces of the plug halves with a siliceous sealing material as used on the periphery of the plug.

Figure 6:
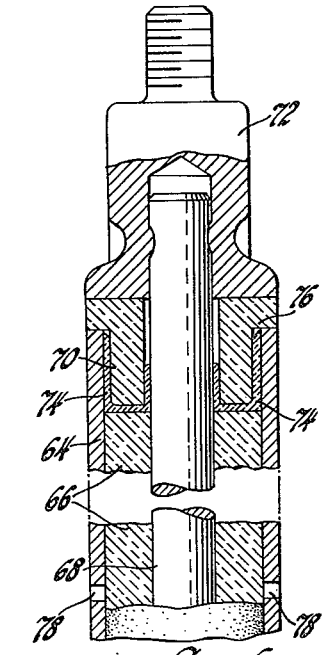
Fig. 6 is a schematic view, partially in section, illustrating an electrical heating element embodying the invention.

Fig. 6 illustrates another embodiment of the invention as used in the construction of an electrical heating element. This structure comprises a shell or housing member 64, preferably of tubular steel or the like, heat-resistant insulating material 66, an electrical heating element 68, a shaped ceramic plug 70, and an adapter tip 72 peened, crimped or otherwise secured to one end of the heating element 68. It will be observed that the ceramic plug 70 not only provides an effective sealing means by virtue of a fused glass seal 74, but that the shoulders 76 of the plug electrically insulate the adaptor tip 72 from the shell 64 thus eliminating the necessity of insulating washers and the like.

In many applications, especially where a rapid heating is encountered, the invention further contemplates providing vent means, such as one or more openings 78 as shown in Fig. 6, located, particularly in the case of thermocouple leads, in a relatively cool portion of the shell or housing member away from the part exposed to rapid heating.

In the preparation of a sealed structure in accordance with the invention while various siliceous sealing materials may be used, I have found that superior results are obtained using as a sealing material a finely divided borosilicate type glass, preferably having an average particle size within the range of about −20 mesh to +100 mesh. A satisfactory commercially available product is "Corning #733 hard sealing glass." A preferred insulating material is the conventional powdered magnesia although other heat-resistant insulating materials also may be used. The ceramic plugs preferably are formed from an alumina body ceramic material such as the commercially available Stupakoff alumina body thermocouple insulating tubing.

In general, the preparation of a sealed structure embodying the invention comprises heating the shell assembly and/or ceramic plug to a temperature high enough to soften or fuse the glass sealing material, typically about 1800° F. with a borosilicate glass, and thereafter pressing the ceramic plug into place within the shell, whether a seal is provided by coating the cylindrical surfaces of the plug, or by fusing a quantity of sealing glass within the open end of the shell. In a preferred embodiment, the plug is recessed slightly in the open end of the housing and the exposed edge of the housing thereafter crimped or peened inwardly to provide additional plug retaining means.

Employing a ceramic plug as contemplated by the present invention not only provides an improved sealing means but facilitates assembly of thermocouple lead wires, etc., as well, since in the hot pressing operation the pusher, typically of Inconel or Nichrome, contacts only the ceramic plug and consequently does not become coated with fused glass, the removal of which would necessitate frequent stoppages in production.

The foregoing description of the present invention has been given for illustrative purposes and no undue limitations should be deduced therefrom. Accordingly, it is to be understood that variations and modifications capable of being accomplished by the mere exercise of skill of the art are to be embraced within the scope of the appended claims.

What is claimed is:

1. An electrical conductor assembly comprising a metal housing having an open end and containing a packed heat-resistant insulating material, a ceramic plug having an opening therethrough positioned adjacent the open end of said housing, an elongated metal electrical conductor extending through said opening and into said insulating material and a layer of glass between said insulating material and said plug extending into said opening and between said housing and said plug, said layer of glass bonding said plug to said housing and said conductor to said plug.

2. An electrical conductor assembly comprising a metal housing having an open end and containing a packed heat-resistant insulating material, a ceramic plug having an opening therethrough positioned adjacent the open end of said housing, an elongated metal electrical conductor extending through said opening and into said insulating material and a layer of borosilicate glass between said insulating material and said plug extending into said opening and between said housing and said plug, said layer of borosilicate glass bonding said plug to said housing and said conductor to said plug.

3. An electrical conductor assembly comprising a metal housing having an open end provided with an inwardly extending flange and containing a packed heat-resistant insulating material, a ceramic plug having an opening therethrough positioned in said housing between said insulating material and said flange, an elongated metal electrical conductor extending through said opening and into said insulating material and a layer of glass between said insulating material and said plug extending into said opening and between said housing and said plug, said layer of glass bonding said plug to said housing and said conductor to said plug.

4. A thermocouple assembly comprising a metal housing having an open end and containing a packed heat-resistant insulating material, a ceramic plug positioned adjacent the open end of said housing and having a pair of openings therethrough, a pair of generally parallel elongated metal electrical conductors extending through said insulating material and through the openings in said plug and a layer of glass between said insulating material and said plug extending into said openings and between said housing and said plug, said layer of glass bonding said plug to said housing and said conductors to said plug.

5. A thermocouple assembly comprising a metal housing having an open end provided with an inwardly extending flange and containing a packed heat-resistant insulating material, an alumina ceramic plug having a pair of openings therethrough in said housing between said insulating material and said flange, a pair of generally parallel elongated metal electrical conductors extending through said insulating material and through the openings in said plug, said conductors being joined externally of said housing to form a thermocouple junction, and a layer of borosilicate glass between said insulating material and said plug extending into said openings and between said housing and said plug, said layer of borosilicate glass bonding said plug to said housing and said conductors to said plug.

6. An electrical heating element comprising a metal housing having an open end and containing a packed heat-resistant insulating material, a ceramic plug having an opening therethrough positioned adjacent the open end of said housing, an elongated electrical heating element extending through said opening and into said insulating material and a layer of glass between said insulating material and said plug extending into said opening and between said housing and said plug, said layer of glass bonding said plug to said housing and said heating element to said plug.

7. A process for sealing an electrical conductor assembly of the type comprising a metal housing having an open end and containing a packed heat-resistant insulating material and an elongated metal electrical conductor extending from said insulating material through the open end of said housing, said process including the steps of providing a quantity of molten glass in the open end of said housing over said heat insulating material and then inserting into the open end of said housing a ceramic plug having an opening therethrough so that the molten glass forms a layer between said ceramic plug and said insulating material and flows into said opening and between said plug and said housing to form a bond between said conductor and said plug and said plug and said housing.

8. A process for sealing an electrical conductor assembly of the type comprising a metal housing having an open end and containing a packed heat-resistant insulating material and an elongated metal electrical conductor extending from said insulating material through the open end of said housing, said process including the steps of providing a quantity of molten borosilicate glass in the open end of said housing over said heat insulating material and then inserting into the open end of said housing a ceramic plug having an opening therethrough so that the molten borosilicate glass forms a layer between said ceramic plug and said insulating material and flows into said opening and between said plug and said housing to form a bond between said conductor and said plug and said plug and said housing.

9. A process for sealing an electrical conductor assembly of the type comprising a metal housing having an open end and containing a packed heat-resistant insulating material and an elongated metal electrical conductor extending from said insulating material through the open end of said housing, said process including the steps of placing a quantity of glass in the open end of said housing over said heat insulating material, heating said glass to cause it to become molten, then inserting into the open end of said housing a ceramic plug having an opening therethrough so that the molten glass forms a layer between said ceramic plug and said insulating material and flows into said opening and between said plug and said housing to form a bond between said conductor and said plug and said plug and said housing, and then bending the open end of said housing to form an inwardly extending flange.

References Cited in the file of this patent

UNITED STATES PATENTS

| | | |
|---|---|---|
| 1,046,084 | Kraus | Dec. 3, 1912 |
| 2,059,072 | White et al. | Oct. 27, 1936 |
| 2,121,761 | Lowry | June 21, 1939 |
| 2,241,505 | Cuttler | May 13, 1941 |
| 2,311,647 | Doran | Feb. 23, 1943 |
| 2,445,159 | Tegge | July 13, 1948 |
| 2,469,211 | Schwarzwalder et al. | May 3, 1949 |
| 2,570,095 | Bucklen et al. | Oct. 2, 1951 |